(12) United States Patent
Tan

(10) Patent No.: US 8,806,769 B2
(45) Date of Patent: Aug. 19, 2014

(54) BULLSEYE INDICATOR AND METHOD

(76) Inventor: Hoon Kiang Tan, Singapore (SG)

( * ) Notice: Subject to any disclaimer, the term of this patent is extended or adjusted under 35 U.S.C. 154(b) by 75 days.

(21) Appl. No.: 13/287,342

(22) Filed: Nov. 2, 2011

(65) Prior Publication Data

US 2013/0104408 A1    May 2, 2013

(51) Int. Cl.
*G01C 9/18* (2006.01)
*G01C 9/36* (2006.01)

(52) U.S. Cl.
CPC ........................................ *G01C 9/36* (2013.01)
USPC .............................................. 33/378; 33/304

(58) Field of Classification Search
USPC ........... 33/378, 379, 387, 388, 389, 390, 301, 33/304, 305
See application file for complete search history.

(56) References Cited

U.S. PATENT DOCUMENTS

| | | | | |
|---|---|---|---|---|
| 685,569 | A * | 10/1901 | Bullard | 33/365 |
| 3,383,772 | A * | 5/1968 | Gardner et al. | 33/373 |
| 3,793,735 | A * | 2/1974 | Humphrey | 33/348 |
| 3,869,806 | A * | 3/1975 | Humphrey | 33/348 |
| 4,349,809 | A | 9/1982 | Tomes | |
| 4,435,108 | A | 3/1984 | Hampton | |
| 4,471,535 | A * | 9/1984 | Kufrovich et al. | 33/378 |
| 4,647,767 | A * | 3/1987 | Jubinski | 33/379 |
| 5,806,197 | A * | 9/1998 | Angelucci | 33/451 |
| 6,095,933 | A * | 8/2000 | Smith | 33/379 |
| 6,098,300 | A * | 8/2000 | Angelucci | 33/451 |
| 6,386,994 | B1 * | 5/2002 | H'Doubler et al. | 33/379 |
| 6,505,409 | B2 | 1/2003 | Toda | |
| 6,631,916 | B1 | 10/2003 | Miller | |
| 6,691,421 | B2 * | 2/2004 | Roth et al. | 33/379 |
| 6,981,330 | B2 * | 1/2006 | Tieszen | 33/370 |
| 7,603,961 | B2 * | 10/2009 | Mayenschein et al. | 33/379 |
| 2005/0017139 | A1 | 1/2005 | Tacklind | |

FOREIGN PATENT DOCUMENTS

| | | | | | |
|---|---|---|---|---|---|
| GB | 2072838 | A * | 10/1981 | | G01C 9/06 |
| GB | 2206693 | A * | 1/1989 | | G01C 9/18 |

OTHER PUBLICATIONS

Radoil, Inc., Online Product Listings, www.radoil.com/subsea-bullseye, Sep. 10, 2010.
Level Devlopments, Online Product Listings, www.leveldevelopments.com/printable/subsea-bullseye-slope-indicator, Nov. 19, 2009.
R&B Manufacturing, Inc., Online Product Listings, www.tiltmeter.com/Bullseye-And-Circular, Sep. 11, 2010.
Miscellaneous Art, 2011.

* cited by examiner

*Primary Examiner* — Yaritza Guadalupe-McCall
(74) *Attorney, Agent, or Firm* — Kenneth L. Nash

(57) ABSTRACT

A bulls eye indicator device and method of manufacture used to measure the two-dimension angle of inclination of equipment that is mounted on a sea bed. A base and transparent window are sealed and fastened together. The transparent window is spherical and forms a dome. A volume between the base and transparent window is filled or substantially filled with liquid. A floating sphere floats against the two-dimensional angular degree indicia.

15 Claims, 2 Drawing Sheets

BULLSEYE INDICATOR AND METHOD

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to the field of subsea oil and gas operations and more specifically to a bulls eye indicator and method, which may be used to measure the angle of inclination of subsea structures on the ocean floor.

2. Background of the Invention

A bulls eye indicator is a type of inclinometer. An inclinometer may also be called, in some circumstances, a clinometer, tilt meter, tilt indicator, slope alert, slope gauge, gradient meter, gradiometer, level gauge, level meter, declinometer, and pitch & roll indicator. Clinometers measure both inclines (positive slopes, as seen by an observer looking upwards) and declines (negative slopes, as seen by an observer looking downward). Astrolabes are inclinometers that were used for navigation and locating astronomical objects. Inclinometers have been used in various applications including airplane instruments, automobile instruments, and marine operations. A floating ball inclinometer has been used in personal vehicles to gauge the angle of inclination of the vehicle and prevent vehicle rollovers and injuries. In one type, a ball with degree markings is supported in a fluid filled transparent container. The instrument provides a reading based on the center of gravity of the vehicle.

The bulls eye indicator, or marine inclinometer, is a device for measuring slope on the sea floor and is commonly used in underwater oil and gas operations. The bulls eye indicator gets the name because the grid lines are generally concentric circles and appear as a bulls eye type target. The apparatus is critical in determining how to properly position underwater equipment and components on the uneven sea floor. This art is commonly used to level subsea blow out preventor stacks, suction piles, subsea Christmas trees, and the like.

The device is typically a cylinder shaped container and a base marked with a bulls eye inclination indicia. The degree markings may be stenciled on the base for viewing through the window. A metal ball inside the container moves based on the inclination and is measured against the degree markings to determine the slope of the underwater device upon which the device rests. The bulls eye indicator instrument is typically secured to the equipment that must be leveled, typically prior to lowering the equipment to the ocean floor.

The device is pressure tested to withstand the sometimes very high water pressure at the depths of the ocean. The bulls eye indicator results are typically viewed by underwater cameras on remotely operated vehicles (ROV) and then transmitted to the surface so that real time leveling adjustments may be made as the equipment is leveled. The bulls eye detector comes in a variety of sizes and angles of inclination which can be measured. The bulls eye detector may provide multiple methods to secure the instrument, including a fixed mounting plate, a leveling base, and may be ROV retrievable.

The inventor has found that while the prior art bulls eye instrument is potentially very accurate mechanically, a common problem with subsea inclinometers is that of parallax error. Parallax error is a distortion caused by the observer and the object being observed being in different lines of sight, due to light waves bending when encountering two or more different mediums, causing inaccurate readings. Accordingly, a typical problem involves the ball used in the instrument being perceived by the observer at a different angle of inclination than the ball truly indicates.

Another problem is that of debris or silt buildup on the window, which may be problematic if the debris cannot be removed. Due to debris, the longer the instrument remains underwater, the more difficult the debris problem becomes to interpret the readings. Prior art inclinometers lack any defense to silt buildup.

The following patents show background prior art related to inclinometers generally.

U.S. Pat. No. 4,349,809, to M. B. Tomes, issued Sep. 14, 1982 discloses an apparatus for detecting the angle of inclination of a vehicle and for providing an alarm signal when the inclination of the vehicle exceeds a predetermined maximum safe level. An elongate, pliant tubular member made of an electrically conductive material has its intermediate segment mounted by an insulative clamp to a vertical panel which may be situated on the vehicle's dashboard. The end segments of the tubular member are upwardly inclined, and the degree of inclination is shown by angular indicia on adjacent portions of the vertical panel. A plurality of spherical contact elements made of an electrically conductive material are positioned within the tubular member. A pair of contact points made of an electrically conductive material are inserted into the opposite ends of the tubular member. When the angle of inclination of the vehicle exceeds the safe level, the contact elements will strike one of the contact points. This causes an electric current from the vehicle's battery to energize an indicator such as a buzzer which provides a warning signal.

U.S. Pat. No. 4,435,108, to J. E. Hampton, issued Mar. 6, 1984, discloses a method of installing sub-sea templates. A subsea template is installed by a method which includes the steps of securing the template in a position beneath the deck of a semi-submersible drilling vessel, moving the semi-submersible drilling vessel to an appropriate offshore site and subsequently lowering the template from the semi-submersible to the sea bed. In addition, at least three anchorage templates may be loaded onto one or both of the pontoons of the semi-submersible drilling vessel at its original position and are subsequently lowered from the pontoons to their respective locations on the sea bed after the semi-submersible has moved to the offshore site.

U.S. Pat. No. 6,631,916, to M. E. Miller, issued Oct. 14, 2003, discloses a guidance system for pull type equipment. An improved equipment guidance system and assembly is described comprising a top plate in releasable engagement with a drawbar of a towing vehicle, a supplemental or ancillary drawbar pivotable about a forward location and movable to an offset position left or right of center by a pair of pistons, and a bottom plate for attachment to the ancillary drawbar and the top plate. The pistons are controlled by a control box that dictates in concert the extension and retraction of the left and right pistons. A signal from the control box is generated from a plurality of sources. One example of a signal source is a tilt sensor that measures inclination relative to gravity. Another example of a signal source is an automatic "whiskers" crop row sensing wand system. Yet another example of a signal source can be generated manually from an operator of the towing vehicle.

U.S. Patent Application Publication 2005/0017139, to C. A. Tacklind, published Jan. 27, 2005, discloses an apparatus including a surface secured to at least one leg, and a leveling apparatus secured to the platform providing an indication of level about at least two axes. A method of positioning the apparatus includes the steps of positioning an end point of a first leg on a fiduciary point; setting a height of a mounting platform by extending said first leg; positioning an end point of a second leg to engage a surface; leveling the mounting platform on a first axis; positioning an end point of a third leg to engage said surface; leveling the mounting platform on a second axis; and repositioning said first leg so that said end point is in desired location.

The above discussed prior art does not solve the aforementioned long standing problems. Accordingly, those of skill in the art will appreciate the present invention which addresses the above and other problems.

SUMMARY OF THE INVENTION

An object of the present invention is to provide an improved bulls eye indicator.

Another object of the invention is to improve the ability to accurately measure a two-dimensional angle of inclination of a subsea object, which is mounted on the ocean floor.

A further possible object is to create a design that reduces and/or substantially eliminates parallax error when reading the angle of inclination.

Another possible object is to prevent the buildup of silt on the inclinometer's face while operated underwater.

Other possible objects and advantages of the present invention will become apparent from the following descriptions, taken in connection with the accompanying drawings, wherein, by way of illustration and example, an embodiment of the present invention is disclosed.

Accordingly, in one embodiment, a bulls eye indicator for use in measuring a two-dimensional angle of inclination of subsea equipment is disclosed. The subsea equipment is to be leveled and mounted on an underwater bed. The bulls eye indicator may comprise components such as, for example, a base and a transparent window sealed with respect to the base and forming a volume therebetween. A liquid at least substantially fills the volume between the base and the transparent window.

A floating member is positioned within volume and floats in the liquid. A plurality of angle measurement lines are formed on the transparent window. The plurality of angle measurement lines indicate the two-dimensional angle of inclination in that the floating member floats upwardly in the liquid to thereby contact the transparent window and the plurality of measurements for visually indicating the two-dimensional angle.

In one embodiment, the transparent window is rounded or spherical to form a dome shape. The liquid may comprise a relatively clear viscous liquid in which the floating member floats and moves.

The floating member may comprise a ball comprised of a solid material with an average density less than a density of the liquid. In one embodiment, the floating member is a contrasting color from the base and plurality of angle measurement lines. Luminous colors may be used. For example a black ball and a luminous yellow background may be utilized.

The plurality of angle measurement lines may comprise a plurality of concentric circles.

In another embodiment, a method for making or using a bulls eye indicator is provided to thereby measure a two-dimensional inclination of a subsea object. The method may comprise steps such as, for example, providing a base and sealingly mounting a transparent window to the base and forming a volume therebetween. Other steps may comprise introducing a liquid into the volume which at least substantially fills the volume between the base and the transparent window.

The method may comprise providing a floating member within the volume, which floats in the liquid, and providing a plurality of angle measurement lines on the transparent window, whereby the plurality of angle measurement lines indicate the two-dimensional angle.

The method provides that the floating member comprises a solid material with a density less than a density of the liquid to thereby float up in the liquid to contact the transparent window for visually indicating the two-dimensional angle.

In one embodiment, the method may comprise providing that the transparent window is spherical or at least rounded to comprise a dome shape. The method may comprise providing that the liquid is transparent.

Other steps may comprise providing that the transparent liquid is a relatively clear viscous liquid in which the floating member floats and/or providing that the floating member comprises a ball comprised of a solid material with an average density less than a density of the liquid to thereby float in the liquid.

The method may comprise providing that the plurality of angle measurement lines comprise a plurality of concentric circles or other suitable indicia.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The present invention provides a device to measure the angle of inclination on the ocean floor and method to make and/or operate the device is hereinafter described. Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
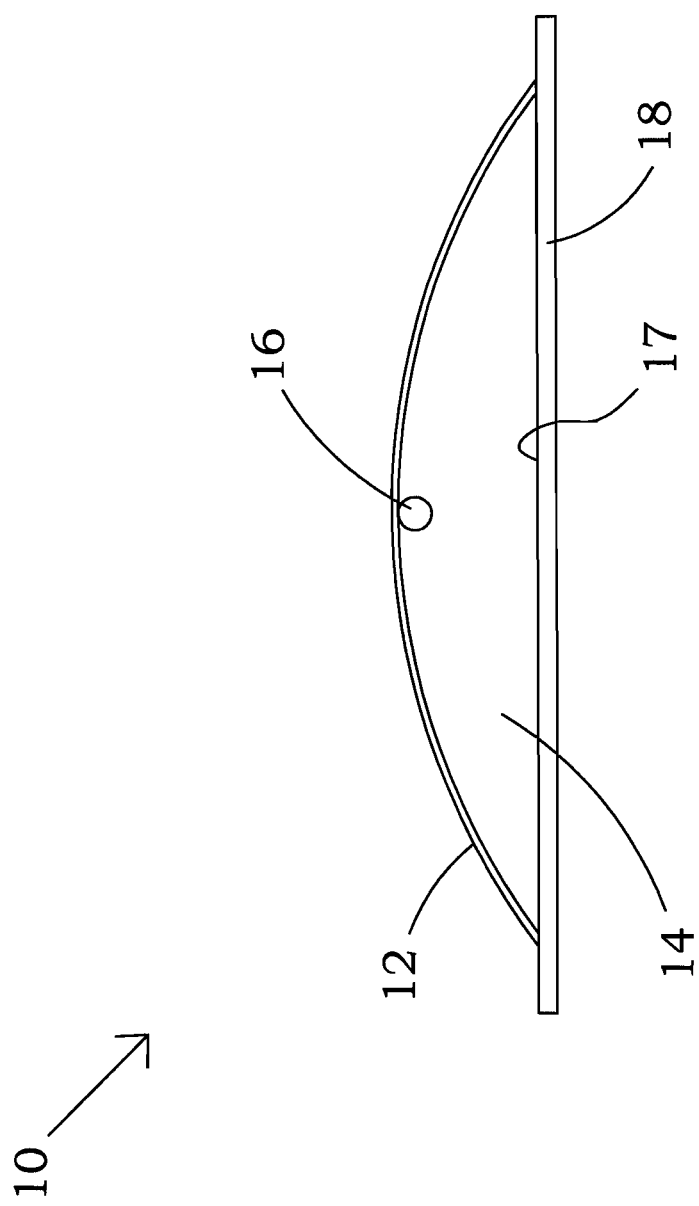
FIG. 1 is a side elevational view, in cross-section, which shows a bulls eye indicator, in accord with one possible embodiment of the present invention.

Referring now to the drawings, and more particularly to FIG. 1, there is shown a cross sectional view of bulls eye indicator or inclinometer 10 in accord with a possible embodiment of the invention. Bulls eye indicator 10 produces a two-dimensional inclination reading.

Figure 2:
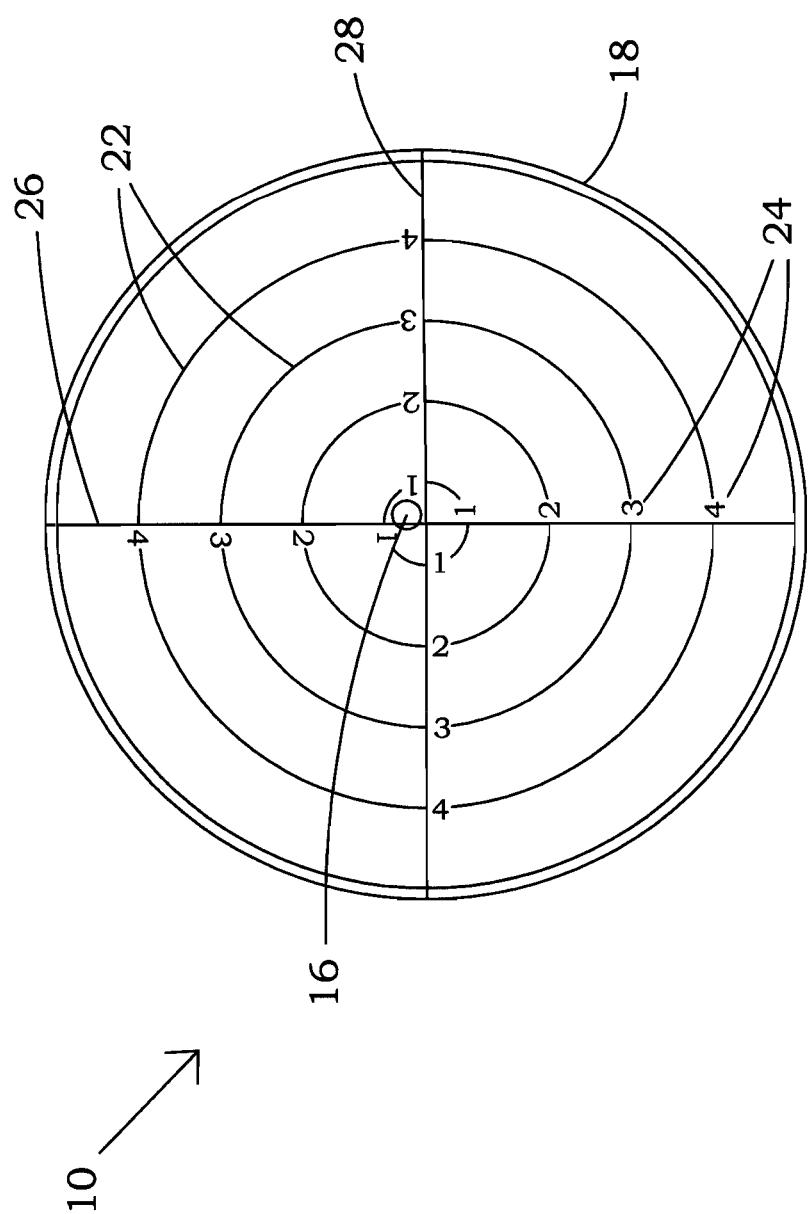
FIG. 2 is a top view of the bulls eye Indicator of FIG. 1, in accord with one possible embodiment of the present invention.

Bulls eye indicator or inclinometer 10 comprises base 18, which may typically be mounted to the subsea equipment (not shown) to be leveled. Base 18 may have a flat top 19 but could also be curved. Base 18 may be painted with a color that contrasts with grid lines 22 and numbers 24, shown in FIG. 2.

Base 18 and transparent window 12 are secured together to form a housing. Base 18 and window 12 must be sealed and sufficiently pressure resistant to operate at significant ocean depths. The housing may be pressure tested to verify that the seals and construction are suitable for high pressure salt water environments and other conditions where the equipment may be utilized. Window 12 may be comprised of glass, plastic, Pyrex or other suitable materials for use at significant ocean depths and pressures.

In one possible embodiment, transparent window 12 is spherical or at least rounded to provide a dome shape. In this way, silt and other debris is less likely to settle and block the view. In one embodiment, the glass or other clear material of the dome of transparent material may have a height of rounded transparent material that may range from one-eighth inch to one-half inch in height. While this range is one presently preferred embodiment, the height of the dome may be greater, if desired. For example, with a larger diameter bulls eye indicator 10, the height may range from one-half to one inch in height. As well, the dome or spherical shape could be more convex to resist debris but the grid or markings 22 (shown in FIG. 2) would have to be adjusted accordingly, as explained hereinafter. However, the present invention could conceivably be built with a flat top, if silt is not considered a problem, and is not limited to the domed or spherical structure that is shown.

The interior of the housing formed by window 12 and base 18 is preferably filled with a clear fluid 14. While many fluids may be utilized, including water, to provide a more vibration resistant reading, a viscous clear fluid may be utilized such as glycerin, oil, or the like. While liquid 14 is preferably clear, the liquid may be colored in a contrasting color with respect to the grid lines and the ball, which will still be visible from the top view, as described herein.

Within the interior, a floating indicator member 16 is provided. Floating member 16 may comprise a rigid ball, made of non-metal materials such as hard plastic, or the like. While a bubble might be used with surface leveling equipment, with the extremely high pressures of a subsea bulls eye indicator, the slightest leakage can significantly alter the size of the bubble and possibly cause the bubble to dissolve, shrink, foam, and/or disappear making use of a bubble less reliable. Thus, a bubble is not the preferred embodiment of floating indicator member 16. The floating indicator member, such as floating ball 16 is solid and less dense than the surrounding liquid inserted into the housing so that ball 16 floats up against window 12 to a position on window 12 related to the angular orientation of the underwater structure. Floating member 16 may be painted various colors to increase the contrast against base 18 and degree markings 22 for improved visibility in subsea applications. The floating member, as floating ball 16, and the grid lines on window 12 can be utilized to reduce and/or essentially eliminate parallax error in accord with the invention. The plastic ball or the like must be sufficiently rigid to avoid changing shape due to any pressure leakage.

In one embodiment, transparent window 12 is marked or etched with inclinometer degree markings 22 and numeric labels 24. Because ball 16 floats up next to the grid of degree markings, the parallax error is reduced or eliminated. The light entering transparent window 12 encounters ball 16 before the light goes through the viscous fluid medium, as occurs in prior art bulls eye indicators. Likewise, the grid lines are formed in window 12, either by etching, painting, and/or the like, and may be at the top or underside of window 12. In the case of the grid markings being on top, then the light does not go through more than one medium. In the case where the grid markings are on the underside, then light only goes through the transparent window medium.

If desired, the axes, such as axis 26 and axis 28 may be labeled to set forth the orientation such as North, South, or other suitable directions because the angular orientation and reading of bulls eye indicator 10 is two-dimensional. The subsea equipment will be able to orient the subsea equipment in two dimensions for leveling the subsea equipment. Thus, the operator may utilize the information for leveling in each direction.

In operation, degree markings 20 cover the domed window of the device providing the measurements from which the operator will determine the angle of inclination. The floating member 16 will float up against the grid formed on otherwise transparent window 12 and move in relation to the two-dimensional slope of the orientation of the equipment being leveled. This allows operator to compare with the degree markings 20 to determine the angle of inclination with respect to the two axes. Remotely operated vehicles or TV cameras transmit feeds of the face of the device to an operator on the surface. By utilizing the floating ball 16 and domed window 12, with grid markings that essentially are engaged, the device eliminates or at least substantially reduces any parallax error.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A bulls eye indicator for use in measuring a two-dimensional angle of inclination of equipment, which is mounted on an underwater bed, said bulls eye indicator comprising:
   a base;
   a transparent window sealed with respect to said base and forming a volume therebetween, said transparent window being sufficiently resistant to pressure for operating on said underwater bed;
   a liquid which at least substantially fills said volume between said base and said transparent window;
   a floating rigid ball within said volume, said floating rigid ball comprised of a solid material with an average density less than a density of said liquid positioned in said volume;
   a plurality of angle measurement lines formed on said transparent window, said plurality of angle measurement lines indicating said two-dimensional angle, said first angle measurement line extending through a zero angle level indication configured for measuring a first angle in a first dimension with a range of measurement extending to opposite sides of said zero angle level along said first measurement line, and a second angle measurement line also extending through said zero angle level configured for measuring a second angle in a second dimension with a range of measurement extending to opposite sides of said zero angle level along said second measurement line;
   whereby said floating rigid ball floats upwardly in said liquid to thereby contact said transparent window for visually indicating said two-dimensional angle.

2. The bulls eye indicator of claim 1, wherein said transparent window is rounded to form a dome shape.

3. The bulls eye indicator of claim 2, wherein a height of said dome shape of said transparent window is between one-quarter inch and one-half inch.

4. The bulls eye indicator of claim 1, wherein said liquid is a relatively clear viscous liquid in which said floating member floats.

5. The bulls eye indicator of claim 1, wherein said floating member comprises a ball comprised of a solid material with an average density less than a density of said liquid.

6. The bulls eye indicator of claim 5, wherein said floating member is of a color that contrasts with said base and said plurality of angle measurement lines.

7. The bulls eye indicator of claim 1, wherein said plurality of angle measurement lines comprise a plurality of concentric circles.

8. The bulls eye indicator of claim 1, wherein said liquid is transparent.

9. A method for a bulls eye indicator used to measure a two-dimensional inclination of a subsea object, comprising the steps of:
providing a base;
sealingly mounting a transparent window to said base and forming a volume;
introducing a liquid into said volume which at least substantially fills said volume between said base and said transparent window;
providing a rigid floating member within said volume, providing that said rigid floating member has an average density less than a density of said liquid to thereby float up in said liquid to contact said transparent window; and
providing a plurality of angle measurement lines on said transparent window, said plurality of angle measurement lines indicating said two-dimensional inclination.

10. The method of claim 9, comprising providing that said transparent window is rounded to comprise a dome shape.

11. The method of claim 10, comprising providing that said transparent window dome shape has a height greater than one-quarter inches.

12. The method of claim 9, comprising providing that said liquid is a relatively clear viscous liquid in which said floating member floats.

13. The method of claim 9, comprising providing that said floating member comprises a ball comprised of a solid material with an average density less than a density of said liquid to thereby float in said liquid.

14. The method of claim 13, comprising providing that said floating member is colored to contrast against said base and said plurality of angle measurement lines.

15. The method of claim 9, comprising providing that said plurality of angle measurement lines comprise a plurality of concentric circles.

\* \* \* \* \*